Dec. 29, 1964

E. MIHALEK 3,163,325

VENDING MACHINE FOR GROCERIES, BREAD OR THE LIKE
AND HAVING A PLURALITY OF SELECTIVELY OPERABLE
COLUMNS OF SWING SHELVES

Filed Aug. 23, 1962

INVENTOR.
EMERY MIHALEK
BY
Ooms, McDougall and Hersh
ATT'YS.

Dec. 29, 1964  E. MIHALEK  3,163,325
VENDING MACHINE FOR GROCERIES, BREAD OR THE LIKE
AND HAVING A PLURALITY OF SELECTIVELY OPERABLE
COLUMNS OF SWING SHELVES
Filed Aug. 23, 1962  8 Sheets-Sheet 2
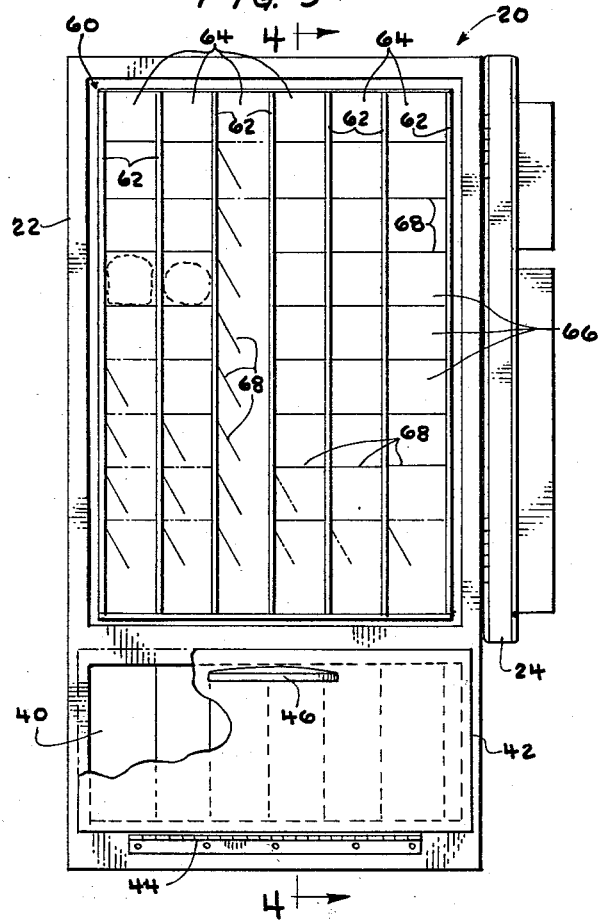
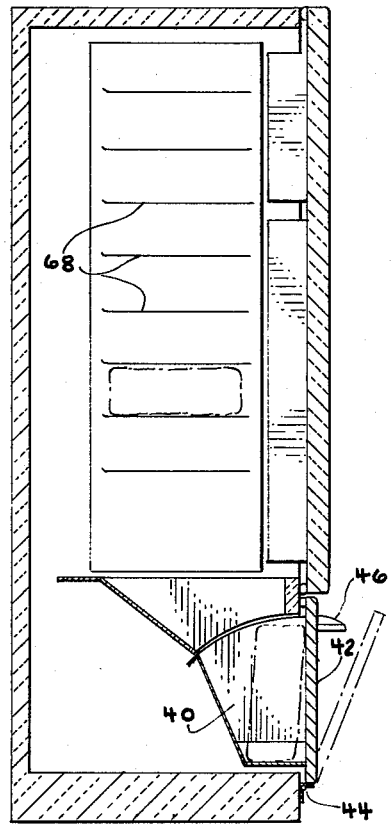
INVENTOR.
EMERY MIHALEK
BY
Ooms, McDougall and Hersh
ATT'YS.

Dec. 29, 1964  E. MIHALEK  3,163,325
VENDING MACHINE FOR GROCERIES, BREAD OR THE LIKE
AND HAVING A PLURALITY OF SELECTIVELY OPERABLE
COLUMNS OF SWING SHELVES
Filed Aug. 23, 1962  8 Sheets-Sheet 3

INVENTOR.
EMERY MIHALEK
BY
Ooms, Mc Dougall and Hersh
ATT'YS.

Dec. 29, 1964 E. MIHALEK 3,163,325
VENDING MACHINE FOR GROCERIES, BREAD OR THE LIKE
AND HAVING A PLURALITY OF SELECTIVELY OPERABLE
COLUMNS OF SWING SHELVES
Filed Aug. 23, 1962 8 Sheets-Sheet 4

INVENTOR.
EMERY MIHALEK
BY
Ooms, McDougall and Hersh
ATT'YS.

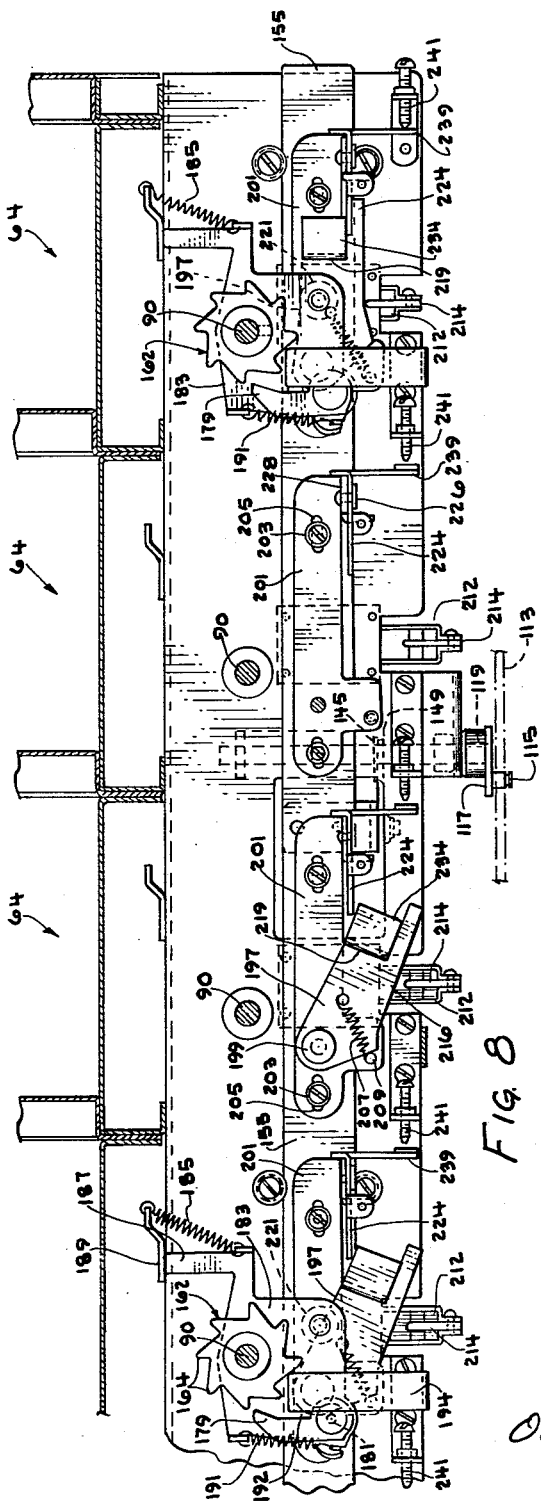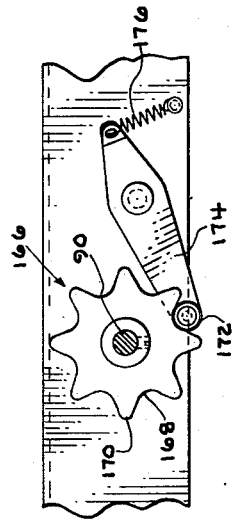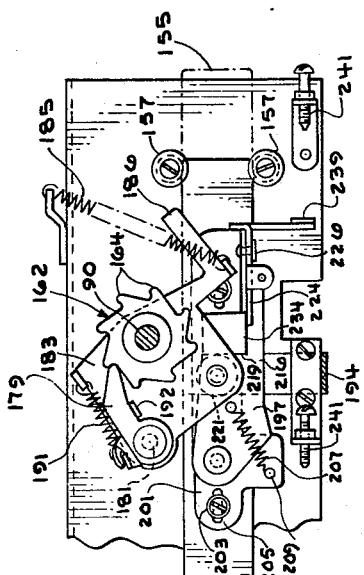

Dec. 29, 1964  E. MIHALEK  3,163,325
VENDING MACHINE FOR GROCERIES, BREAD OR THE LIKE
AND HAVING A PLURALITY OF SELECTIVELY OPERABLE
COLUMNS OF SWING SHELVES
Filed Aug. 23, 1962  8 Sheets—Sheet 6

INVENTOR.
EMERY MIHALEK
BY
Ooms, McDougall and Hersh
ATT'YS.

Dec. 29, 1964 E. MIHALEK 3,163,325
VENDING MACHINE FOR GROCERIES, BREAD OR THE LIKE
AND HAVING A PLURALITY OF SELECTIVELY OPERABLE
COLUMNS OF SWING SHELVES
Filed Aug. 23, 1962 8 Sheets-Sheet 7

INVENTOR.
EMERY MIHALEK
BY
Ooms, McDougall and Hersh
ATT'YS.

Dec. 29, 1964  E. MIHALEK  3,163,325
VENDING MACHINE FOR GROCERIES, BREAD OR THE LIKE
AND HAVING A PLURALITY OF SELECTIVELY OPERABLE
COLUMNS OF SWING SHELVES
Filed Aug. 23, 1962  8 Sheets-Sheet 8

INVENTOR.
EMERY MIHALEK
BY
Ooms, McDougall and Hersh
ATT'YS.

United States Patent Office 3,163,325
Patented Dec. 29, 1964

3,163,325
VENDING MACHINE FOR GROCERIES, BREAD OR THE LIKE AND HAVING A PLURALITY OF SELECTIVELY OPERABLE COLUMNS OF SWING SHELVES
Emery Mihalek, Country Club Hills, Ill., assignor to Hershey Mfg. Co., Chicago, Ill., a corporation of Illinois
Filed Aug. 23, 1962, Ser. No. 218,900
8 Claims. (Cl. 221—90)

This invention relates to vending machines for dispensing articles upon the deposit of one or more coins in the machine.

One object of the present invention is to provide a new and improved vending machine which is especially well adapted for dispensing bread, groceries, or other articles of merchandise.

A further object is to provide a new and improved vending machine which affords a choice or selection to the purchaser of a variety of different articles of merchandise which may be contained within the machine.

Another object is to provide a new and improved vending machine having a single dispensing motor for dispensing all of the various articles of merchandise contained within the machine, together with a control mechanism whereby the motor is effective to dispense a particular kind of article, as selected by the customer.

A further object is to provide a new and improved vending machine which is highly versatile yet extremely dependable in operation and low in cost.

Further objects and advantages of the present invention will appear from the following description, taken with the accompanying drawings, in which:

FIG. 3 is a front view of the machine with the front door open.

FIG. 4 is a vertical section taken generally along a line 4—4 in FIG. 3.

FIG. 8 is a horizontal section taken generally along a line 8—8 in FIG. 5.

FIG. 9 is a view similar to the right-hand portion of FIG. 8 but showing a change of position of various parts.

FIG. 10 is a fragmentary horizontal section, taken generally along a line 10—10 in FIG. 5.

Figure 1:
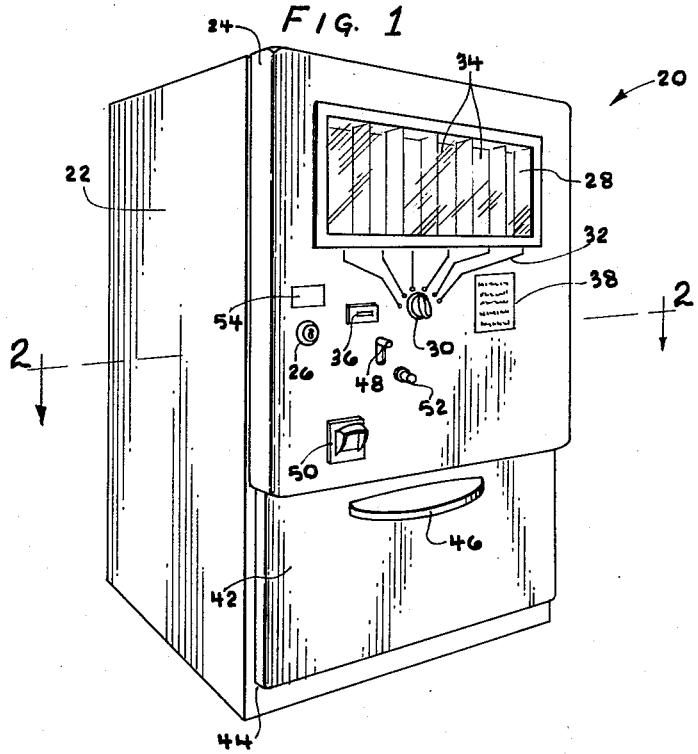
FIG. 1 is a general perspective view of a vending machine to be described as an illustrative embodiment of the present invention.
Figure 2:
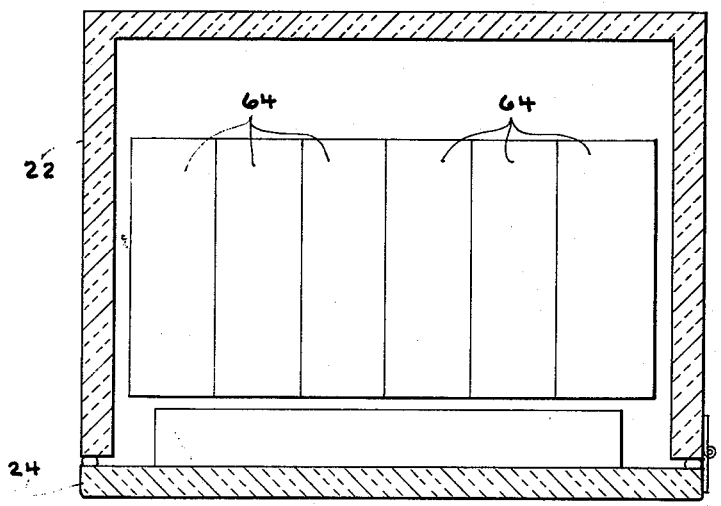
FIG. 2 is a horizontal section taken generally along a line 2—2 in FIG. 1.

It will be seen that the drawings illustrate a vending machine 20 which is especially well adapted for dispensing bread, groceries or other articles of merchandise. The machine 20 is housed in a cabinet 22 having a front door 24 which may be opened by maintenance and service personnel to obtain access to the mechanisms within the cabinet. Normally, the door 24 is held closed by a lock 26.

The various articles of merchandise to be dispensed by the machine are on display behind a window 28 in the front door 24 of the machine. In this case, the machine 20 is adapted to dispense six different articles of merchandise. The purchaser may select any desired article by operating a selector switch control knob 30 to any one of six different positions corresponding to the various articles held by the machine. Guide lines 32 extend between the six positions of the selector knob 30 to the corresponding display compartments 34 behind the display window 28. When the purchaser has made his selection, he drops one or more coins into a coin slot 36. An instruction panel 38 is provided on the front of the machine to tell the purchaser the price of the various articles. When coins amounting to the full price of the selected article have been deposited in the coin slot 36, the machine 20 dispenses one of the selected articles into a bin or compartment 40 in the lower front portion of the cabinet 22, as shown to best advantage in FIGS. 3 and 4. The purchaser is able to remove the article from the compartment 40 by opening a door 42 which has hinges 44 at the bottom and is adapted to swing outwardly, as indicated in broken lines in FIG. 4. The door 42 has a conveniently placed handle 46 adjacent its upper edge.

If a bent coin becomes lodged in the coin mechanism, the purchaser may return it by pushing a coin return member 48 downwardly, which causes the coin to be discharged into a coin return cup 50, from which it may be removed by the purchaser. If the purchaser decides to change his selection after a portion of the required purchase price has been deposited in the coin slot 36, he may press a cancel button 52, which causes the coins already deposited to be returned into the coin return cup 50.

The machine 20 is provided with an empty light 54 to provide an indication that the article selected by the purchaser is no longer present in the machine. The empty light 54 is energized if the purchaser moves the control knob 30 to any position as to which the machine is empty. This is a warning to the purchaser to make a different selection.

Within the cabinet 22, the vending machine 20 is provided with a dispensing mechanism 60 which may comprise a plurality of vertical guides or partitions 62. Seven of these guides 62 are provided in the illustrated machine, so as to define six vertical compartments or chutes 64 between the guides. A different article of merchandise may be dispensed from each compartment 64. Each chute or compartment 64 is subdivided into pigeonholes 66 by a plurality of shelves 68, adapted to be released for downward swinging movement in the manner of a trap door, so that the article of merchandise, such as a loaf of bread, supported on the shelf, will be dropped into the bin or compartment 40. The machine is provided with a mechanism, to be described shortly, whereby the shelves 68 for each chute 64 may be released in sequence from bottom to top, so that the articles will be dispensed one by one, as they are selected by the purchaser.

Figure 11:
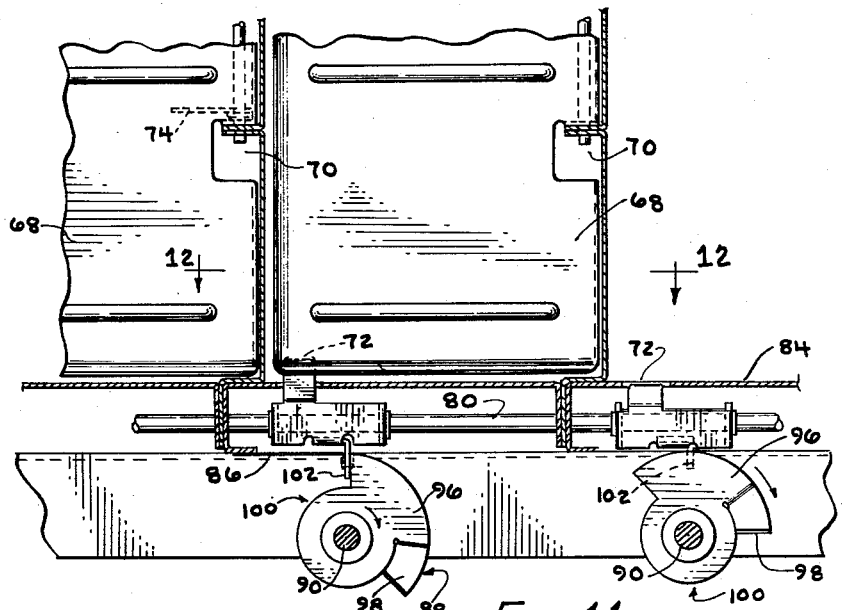
FIG. 11 is a fragmentary horizontal section taken generally along a line 11—11 in FIG. 6.
Figure 12:
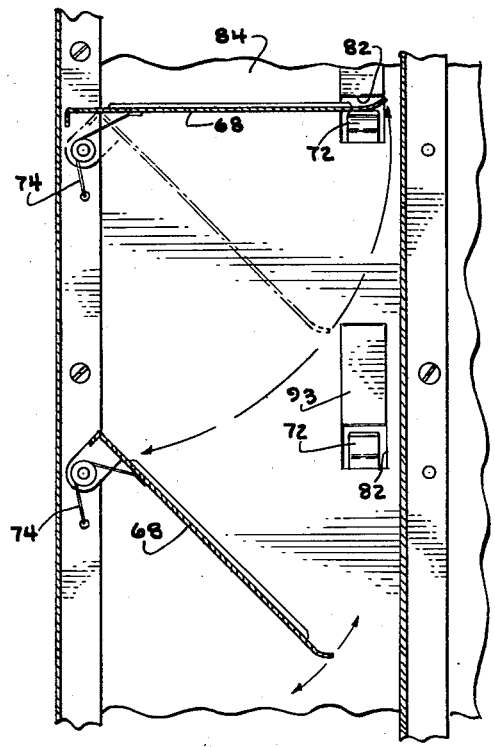
FIG. 12 is a fragmentary vertical section, taken generally along a line 12—12 in FIG. 11.

Thus, as shown to best advantage in FIGS. 11 and 12, hinges 70 are provided on one side of each shelf 68 so that the shelf will be adapted to swing downwardly when released. Initially, each shelf 68 is supported in a horizontal position by a latch or catch 72. The manner in which the latches 72 are released will be described presently.

As shown in FIG. 3, the released shelves hang at an inclined angle so as to act as baffles for retarding the downward movement of the articles released from the shelves above. In some cases, only alternate shelves may be employed as baffles, and the rest may be allowed to hang in a vertical position when released. As shown to advantage in FIG. 12, the released shelves may be supported in the inclined position by springs 74. Thus, an article falling from a point above the released shelf will push the shelf downwardly against the resistance of the spring 74.

In this case, each vertical chute 64 is provided with eight releasable shelves 68, defining eight of the pigeon-holes 66. Thus, the capacity of the illustrated machine is forty-eight articles. Of course, a machine of any desired capacity may be built.

Each of the latches 72 is in the form of a lever which is swingable about a pivot 80. Each latch 72 is adapted to project forwardly through a slot 82 in a plate 84 which forms the rear wall of the corresponding vertical compartment or chute 64. The latch 72 engages the lower edge of the slot 82 to limit downward swinging movement of the latch. Each latch 72 is provided with a spring 86 which biases the latch 72 downwardly into its extended position.

The latches 72 are adapted to be swung upwardly, into their shelf-releasing positions, by cams 88 mounted on vertical shafts 90. One of the cams 88 is provided for each shelf 68. Moreover, one of the vertical shafts 90 is provided for each vertical chute or compartment 64. The cams 88 for each vertical chute 64 are mounted on the corresponding shaft 90 and are staggered angularly about the shaft so that the latches 72 will be released in sequence from bottom to top, as the shaft is rotated. In a manner to be described shortly, each shaft 90 may be advanced step by step, as articles are selected by the purchaser, so as to release each shelf 68 and permit the article supported thereby to fall into the receiving bin 40. In FIG. 11, the right-hand latch 72 is shown in its retracted, upwardly swung position, while the left-hand latch is shown in its extended position. In the upper portion of FIG. 7, the released or retracted position of the latch 72 is shown in broken lines.

A fixed inclined deflector or baffle 93 is provided above each of the latches 72 to protect the latch from being struck by downwardly falling articles of merchandise as they are dispensed.

Each of the eight cams 88 on each shaft 90 is slightly different in shape to provide for the sequential retraction of the latches 72 for the corresponding vertical chute 64. In general, however, each cam 88 is in the form of a circular disk having a flat outer portion 96, a sloping cam portion 98 at the leading end of the flat portion 96, and a cutaway or gap portion 100. The gap 100 is adapted to receive an arm or tab 102 on the corresponding latch 72. When the arm 102 is opposite the gap 100, there is clearance between the cam and the arm 102 so that the latch 72 remains in its extended position. When the shaft 90 is rotated to such an extent that the sloping cam portion 98 reaches the arm 102, the arm is pushed downwardly so as to retract the latch 72. The flat portion 96 of the cam holds the arm 102 in its downwardly swung position and thus retains the latch 72 in its retracted position.

Figure 13:
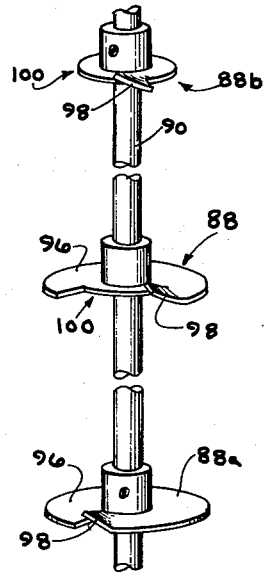
FIG. 13 is a fragmentary perspective view showing an assembly of cans employed in the dispensing mechanism.
Figure 14:
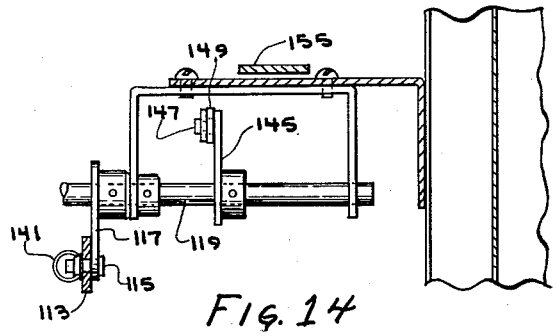
FIG. 14 is a fragmentary elevational section taken generally along a line 14—14 in FIG. 5.
Figure 15:
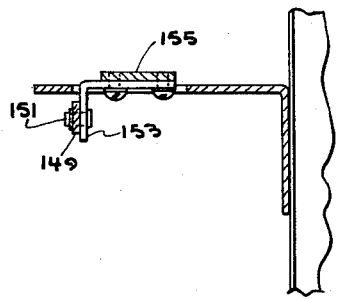
FIG. 15 is a fragmentary vertical section taken generally along a line 15—15 in FIG. 5.

The various cams 88 on each shaft 90 differ in the length of the flat portion 96 and the length of the gap 100. In fact, the lowermost cam, designated 88a in FIG. 13, does not have a gap portion. The flat portion 96 extends for the entire circumference of the cam 88a, except for the portion occupied by the sloping cam portion 98. On the other hand, the uppermost cam on each shaft, designated 88b in FIG. 13, does not have a flat portion 96, but only a sloping cam portion 98 and a gap 100, which extends for the entire circumference of the cam except for the portion occupied by the sloping cam portion 98. In FIG. 13, the uppermost cam 88b is shown out of position for clarity of illustration.

Figure 18:
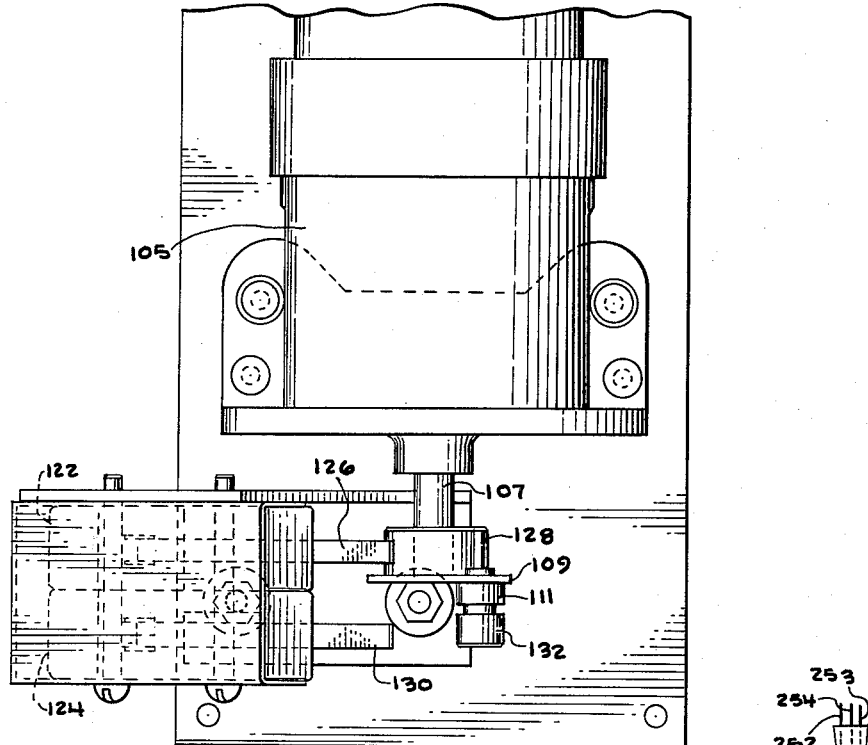
FIG. 18 is a fragmentary plan view of the dispensing motor, taken generally as indicated by the line 18—18 in FIG. 5.

In the illustrated machine, the shelf-releasing shafts 90 are adapted to be operated, as selected by the purchaser, by a single geared-down electric motor 105 (FIG. 5) having a shaft 107 on which a crank 109 is mounted. The crank 109 has a pin 111 on which one end of the link 113 is pivoted. The other end of the link 113 is connected to a pin 115 on an arm 117 which is secured to a shaft 119. Thus, the arm 117 and the shaft 119 are rocked back and forth for each revolution of the motor shaft 107. As will be explained in greater detail shortly, the motor 105 is operated through one revolution for each dispensing cycle of the machine. To provide for such operation of the motor 105, the machine is provided with two motor control switches 122 and 124, as shown to advantage in FIG. 18. It will be seen that the switch 122 has a control arm 126 which is adapted to be operated by a small pin 128 on the crank arm 109. The switch 124 has a control arm 130 which is adapted to be operated by a pin 132 which constitutes an extension of the link pin 111. In the initial or home position of the motor shaft 107, both switches 122 and 124 are operated by the pins 128 and 132. Further details of the operation of the motor 105 will be described in connection with the electrical circuit diagram of the machine.

Preferably, a yieldable connection is provided between the link 113 and the pin 115 in order to avoid damage to the mechanism or to the motor 105 in the event the mechanism should jam. Thus, the link 113 is preferably formed with a slot 139 which is received over the pin 115. A coil spring 141 is stretched between the pin 115 and an anchor pin 143 on the link 113. The spring 141 is strong enough so that the right-hand end of the slot 139 is normally held against the pin 115 during the operation of the motor 105.

In the illustrated construction, it will be seen that a second arm 145 is secured to the shaft 119 and is fitted with a pin 147 to which one end of a link 149 is connected. The other end of the link 149 is connected to a pin 151 which is mounted on a lug or flange 153 projecting downwardly from a horizontal slide bar 155. It will be realized that a reciprocating motion is imparted to the slide bar 155 during each revolution of the motor shaft 107. Grooved rollers 157 may be employed to guide the slide bar 155. The slide bar 155 provides a particularly advantageous form of a reciprocatory member in this instance, but it will be understood that other types of reciprocatory members may be utilized.

For each of the vertical shafts 90, the machine is provided with a solenoid 160 which may be energized to establish an operating connection between the slide bar 155 and the corresponding shaft 90, so that the shaft 90 will be advanced through one step by the reciprocating movement of the slide bar 155. In this case, a ratchet wheel 162 is secured to each shaft 90 near the lower end thereof. Each ratchet wheel 162 has eight teeth 164, corresponding to the eight cams 88 mounted on the shaft 90.

To index the shaft 90 in each of its eight positions, each shaft 90 is provided with an indexing wheel or cam 166 (FIG. 10) having eight notches 168 therein. Teeth 170 are formed between the notches 168. The indexing wheel 166 is engaged by a roller or other follower element 172 mounted on the end of a lever 174. A spring 176 is connected to the lever 174 so as to bias the roller 172 against the wheel 166.

Each ratchet wheel 162 is adapted to be advanced, step by step, by a corresponding pawl 179 which is swingably mounted on a pivot pin 181 secured to a swingable plate or carriage 183. It will be seen that the plate 183 is swingable about the shaft 90. The plate 183 is biased to its initial position by a spring 185. In the initial position of the plate 183, a stop arm 187 on the plate 183 is engaged with a fixed stop 189.

A spring 191 may be connected between the pawl 179 and the plate 183 so as to bias the pawl toward the ratchet wheel 162. In this case, the pawl 179 is formed with a tab or flange 192 which is engageable with a fixed stop 194, in the initial position of the swingable plate 183, to lift the pawl 179 from the ratchet wheel 162 so that the shaft 90 may be rotated backward by the service man who fills the machine.

In the illustrated mechanism, the slide bar 155 is provided with a plurality of pawls or control arms 197 which correspond to the vertical chutes 64 and the corresponding swingable plates 183. Each control arm 197 is mounted on a pivot 199 which is secured to an adjustable bracket or mounting plate 201. It will be seen that the mounting plate 201 is secured to the slide bar 155 by means of screws 203 or the like which extend through slots 205 in the mounting plate 201. The exact position of the plate 201 may be adjusted by loosening the screws 203.

Initially, each control arm or pawl 197 is biased rearwardly by a spring 207 which is connected between the pawl 197 and a pin 209 on the mounting plate 201. The pin 209 acts as a stop to limit the rearward movement of the pawl 197.

The solenoid 160 is adapted to swing the corresponding pawl or control arm 197 forwardly so as to actuate the corresponding swingable plate 183. Thus, each solenoid 160 has an armature 212 to which an upwardly projecting extension 214 is rigidly connected. When the solenoid 160 is energized, the extension 214 engages the rear edge 216 of the corresponding pawl 197 and swings the pawl forwardly, as shown in the right-hand portion of FIG. 8. In this position, the pawl 197 is adapted to actuate the corresponding swingable plate 183, when the slide bar 155 is reciprocated by the motor 105. For this purpose, each pawl 197 is formed with an upwardly projecting flange or shoulder 219 which is engageable with a roller 221 on the corresponding swingable plate 183. Thus, the swingable plate 183 will be swung in a clockwise direction when the slide bar 155 is moved to the left, as shown in FIG. 9. In this way, the pawl 179 will advance the ratchet wheel 162 through one step.

Figures 16, 17:
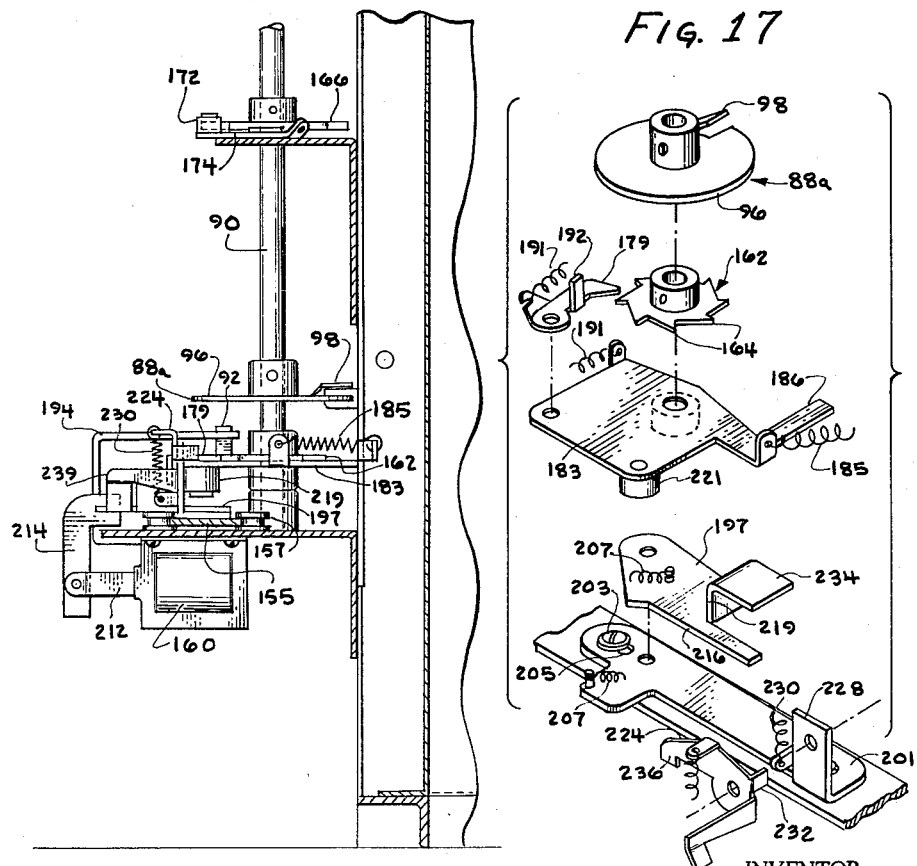
FIG. 16 is a fragmentary vertical section taken generally along a line 16—16 in FIG. 5.
FIG. 17 is an exploded perspective view of a portion of the dispensing mechanism.

In the illustrated machine, means are preferably provided for latching the pawl 197 in its forwardly swung position, as shown in the right-hand portion of FIG. 8. In this way, momentary energization of the solenoid 160 will be sufficient to set and maintain the corresponding pawl 197 in the position in which it will actuate the corresponding swingable plate 183, when the slide bar 155 is reciprocated by the motor 105. Thus, each of the illustrated pawls 197 is provided with a corresponding latching lever 224 which is swingable about a pivot 226. As shown to advantage in FIG. 17, the pivot 226 is mounted on an upstanding flange 228 which is formed on the adjustable mounting bracket 201. It will be recalled that the mounting bracket 201 is secured to the slide bar 155. A spring 230 is connected between the latching lever 224 and the bracket 201, to bias the latching lever 224 in a counterclockwise direction. To limit the counterclockwise movement of the lever 224, a stop tab 232 is formed on the lever and is engageable with the flange 228.

To cooperate with the latching lever 224, the corresponding pawl 197 is formed with a horizontal flange 234 which projects outwardly from the upper end of the vertical flange or shoulder 219. The latching lever 224 has a downwardly projecting end portion 236 which initially engages the upper side of the horizontal flange 234, as shown to advantage in FIG. 5. When the pawl 197 is swung forwardly by the solenoid 160, the end portion 236 of the latching lever 224 moves behind the flange 234, under the biasing impetus of the spring 230, as shown in the right-hand portion of FIG. 5. Thus, the latching lever 224 retains the pawl 197 against rearward movement, even if the solenoid 160 is de-energized.

Figure 5:
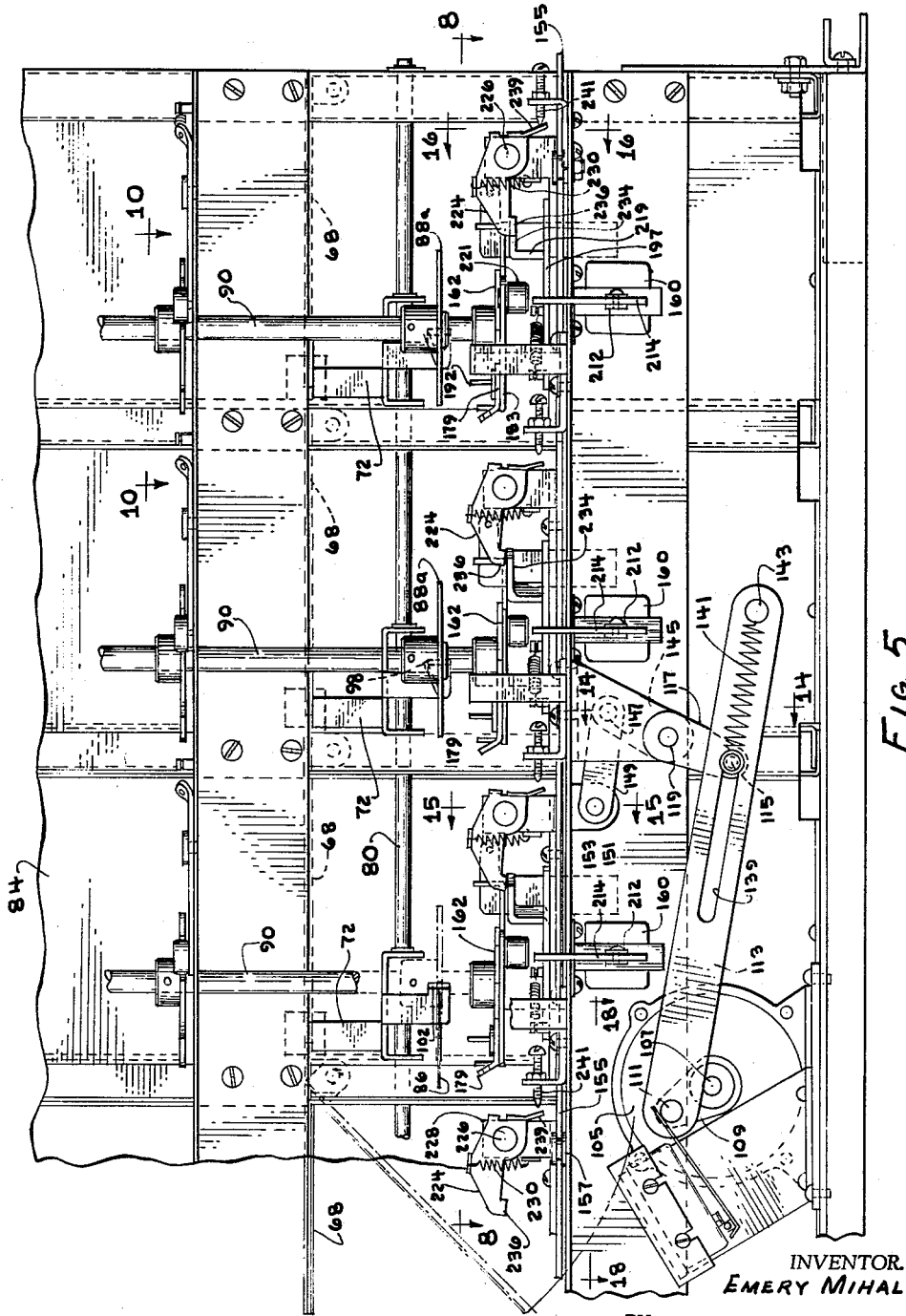
FIG. 5 is a fragmentary rear view of the lower portion of the selective dispensing mechanism.

The latching lever 224 is not released from the corresponding flange 234 on the pawl 197 until the slide bar 155 is moved to the right beyond the position shown in FIG. 5, whereupon an arm 239 on the latching lever 224 engages a fixed stop 241, so that the movement of the slide bar 155 to the right will swing the latching lever 224 in a clockwise direction. In this way, the end portion 236 is moved away from the flange 234 so that the spring 207 will be able to return the pawl 197 in a rearward direction to its initial position. When the slide bar 155 again is moved to the left, the arm 239 is disengaged from the stop 241. It will be seen that each stop 241 is shown in the form of an adjustable screw.

During each revolution of the motor 105, the slide bar 155 is first moved to the left a considerable distance and then is returned to the right somewhat beyond its original position, so as to release any of the latching levers 224 which may have been set during the initial portion of the cycle. The slide bar 155 is then returned to the left to its initial position.

Figure 19:
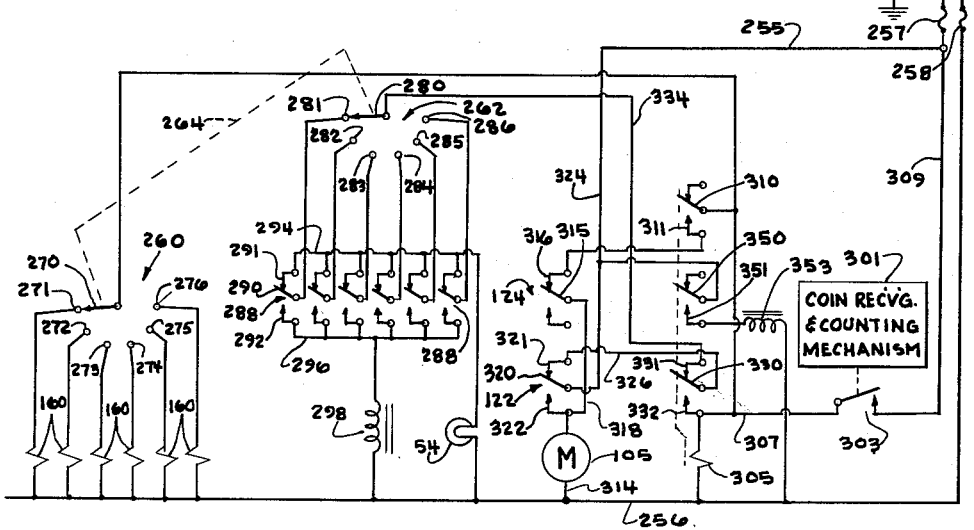
FIG. 19 is a simplified circuit diagram of the vending machine.

FIG. 19 illustrates a simplified schematic circuit diagram of the vending machine. In the conventional manner, the machine is adapted to be connected to commercial alternating current power lines by means of a plug 250 having line contacts 252 and 253 and a ground contact 254. Within the machine, power line leads 255 and 256 are connected to the contacts 252 and 253 through fuses 257 and 258, respectively.

It has already been indicated that a selector knob 30 is provided on the front of the vending machine 20 so that the purchaser may select the particular article to be dispensed. In this case, the knob 30 has six possible positions. Within the machine, the knob 30 is adapted to operate selector switches 260 and 262. As indicated by a broken line, 264, these switches 260 and 262 are ganged together and are connected to the knob 30.

It will be seen that the selector switch 260 has a movable contact 270 which is movable into engagement with a series of six fixed contacts 271–276. The six control solenoids 160 of the dispensing mechanism are connected between the power line 256 and the respective fixed contacts 271–276.

Figure 6:
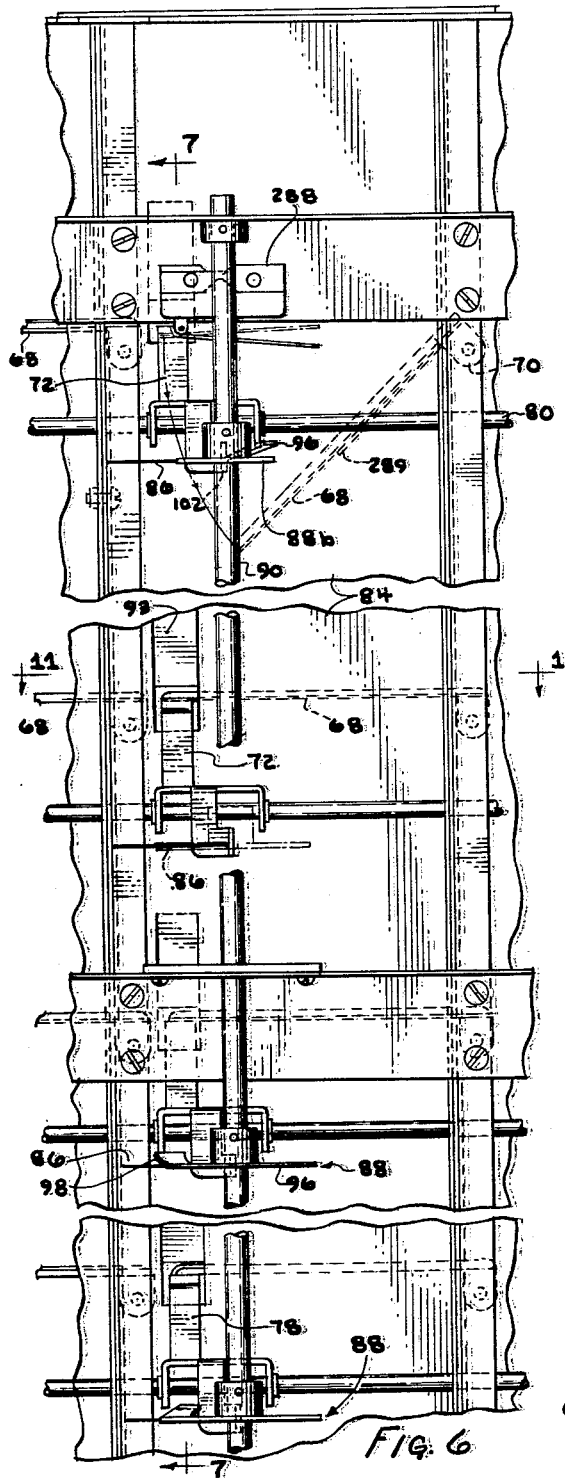
FIG. 6 is a fragmentary rear view showing the upper portion of the selective dispensing mechanism.
Figure 7:
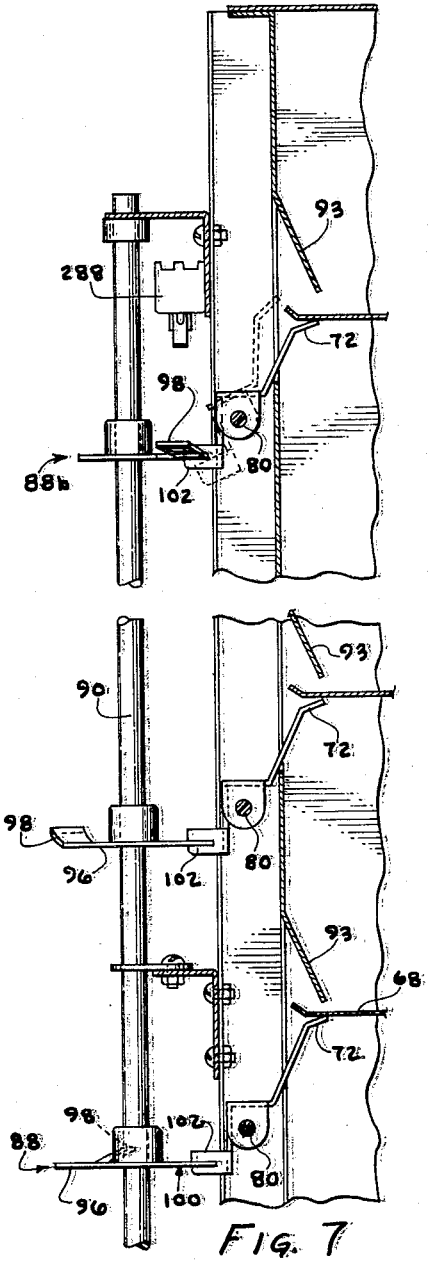
FIG. 7 is an elevational section taken generally along a line 7—7 in FIG. 6.

Similarly, the selector switch 272 has a movable contact 280, engageable with any of a series of six fixed contacts 281–286. A series of six empty switches 288 is connected to the contacts 281–286. One of the empty switches 288 is shown in FIGS. 6 and 7. One empty switch is provided for each vertical chute or compartment 64. The topmost swingable shelf 68 in each chute 64 is provided with a rearwardly projecting finger or tab 289 which operates the empty switch 288 when the shelf is in its raised position. When the topmost shelf 68 drops downwardly due to the release of its latch 72, the tab 289 is disengaged from the switch 288 whereupon the switch moves to its empty position by internal spring action. The empty position of the switch gives an indication that the particular chute 64 is empty.

In FIG. 19, each of the empty switches 288 is in its empty position. It will be seen that each switch 288 comprises a movable contact 290 which is engageable with either of two fixed contacts 291 and 292. All of the contacts 291 of the various switches 288 are connected together by means of a lead 294. The empty light 54, also shown in FIG. 1, is connected between the lead 294 and the power line 256.

It will be seen that all of the switch contacts 292 are connected together by means of a lead 296. A coin chute solenoid 298 is connected between the lead 296 and the power line 256. The solenoid 298 must be energized in order for the machine to accept any coin. If the solenoid 298 is not energized, the coin will be returned into the coin return cup 50. In this case, the empty switches 288 provide six different parallel paths through which the solenoid may be energized. If all of these switches 288 are in their empty positions, the entire machine is empty and the solenoid 298 is de-energized so that the machine will not accept coins.

The machine is provided with a coin receiving and counting mechanism 301, which may include slug rejectors, steppers, relays, switches and the like, as will be known to those skilled in the art. However, for the sake of clarity and simplicity, such mechanism is shown merely as a block in FIG. 19. When coins amounting to the predetermined purchase price have been deposited in the coin slot 36, the coin receiving and counting mechanism 301 is effective to close a switch 303 which may actually be a composite of several switches associated with the steppers or other counters in the mechanism 301. For simplicity, the switch 303 will be referred to as a single switch. It will be understood that the purchase price of the various articles dispensed by the machine differ, and that the selector knob 30 may operate control switches or other components in the coin receiving and counting mechanism 301, so as to change the purchase price.

The closure of the switch 303 initiates the vending cycle of the machine and is adapted to energize a vending solenoid or relay 305. It will be seen that one side of the vending solenoid 305 is connected to the power line 256. A lead 307 extends from the other side of the vending solenoid 305 to one side of the switch 303. The other side of the switch 303 is connected to the power line 255 by means of a lead 309. Thus, closure of the switch 303 will connect the vending solenoid 305 across the lines 255 and 256, so that the solenoid will be energized.

The vending solenoid or relay 305 is adapted to operate a movable contact 310 which is movable against a fixed contact 311 when the solenoid 305 is energized. It will be seen that the movable contact 310 is connected to the lead 307. In addition, the lead 307 is connected to the movable contact 270 of the selector switch 260. Thus, the movable contacts 270 and 310 are energized when the coin operated switch 303 is closed. At the beginning of the vending cycle, the movable contact 270 will be in engagement with one of the fixed contacts 271–276. Thus, one of the control solenoids 160 will be energized by the closure of the coin operated switch 303. Accordingly, the corresponding pawl 197 will be moved forwardly and will be latched in its forwardly moved position by its latching lever 224.

The fixed contact 311 is connected to the motor 105 by way of the motor control switch 124. In the initial position of the motor 105, the switch 124 forms a closed circuit between the contact 311 and one side of the motor 105. The other side of the motor is connected to the power line 256 by a lead 314.

It will be seen that the switch 124 comprises a movable contact 315 which is engageable with a fixed contact 316. A lead 317 extends between the contact 311 and the contact 316. The contact 315 is connected to the motor 105 by a lead 318. In the initial position of the motor 105, the switch 124 is operated to the position in which the movable contact 315 engages the fixed contact 316. Thus, the closure of the relay contacts 310 and 311 energizes the motor 105.

The switch 122 has a movable contact 320 which may be shifted between fixed contacts 321 and 322. It will be seen that the contact 322 is connected to the lead 318 which extends to the motor 105. The movable contact 320 is connected to a lead 324 which extends to the power line 255. By means of a lead 326, the fixed contact 321 is connected to another movable contact 330 on the relay or solenoid 305. It will be seen that the contact 330 is movable between contacts 331 and 332. In this case, the contact 331 is connected to the movable selector switch contact 280 by means of a lead 334. The contact 332 is connected to the lead 307 which is energized by the closure of the coin operated switch 303.

In the initial position of the motor 105, the movable contact 320 engages the contact 321. Thus, current is supplied from the power line 255 to the selector switch contact 280 through the contacts 320 and 321. The selector switch contact 280 supplies current to one of the six empty switches 288. If this empty switch is in its empty position, the empty light 54 will be energized through the corresponding switch contacts 290 and 291. If the particular switch is in the opposite position, the solenoid 298 will be energized through the corresponding contacts 290 and 292.

When the vending solenoid or relay 305 is energized by the closure of the coin operated switch 303, the movable contact 330 is moved against the contact 332. This establishes a temporary holding circuit for the vending solenoid 305. At the same time, the circuit to the selector switch contact 280 is broken so that the solenoid 298 will be de-energized. Thus, no more coins will be accepted until the vending solenoid 305 has been de-energized. The temporary holding circuit for the vending solenoid 305 extends from the power line 255 through the lead 324, contacts 320 and 321, and the contacts 330 and 332, to the lead 307. Thus, the vending solenoid 305 will remain energized, even though the coin operated switch 303 may be closed only momentarily.

The rotation of the motor 105 causes both of the switches 122 and 124 to be shifted, by internal spring action, from the position shown in FIG. 19 to the opposite position. However, the switch 122 is shifted at a time prior to the shifting of the switch 124, because the operating pin 132 for the switch 124 is substantially larger than the operating pin 128 for the switch 122. When the switch 122 is shifted, the movable contact 320 engages the fixed contact 322 so that a direct energizing circuit for the motor 105 is established through the lead 324 and the contacts 320 and 322. Thereafter, the motor 105 is energized, independently of the vending solenoid 305. Moreover, the temporary holding circuit for the vending solenoid 305, through the contacts 320 and 321, is broken, so that the vending solenoid will be de-energized. The subsequent shifting of the switch 124 opens the contacts 315 and 316.

When the motor 105 has completed one revolution, both of the switches 122 and 124 are shifted back to the positions shown in FIG. 19. The opening of the contacts 320 and 322 stops the motor 105. The closing of the contacts 315 and 316 conditions the motor circuit for another vending cycle.

The vending solenoid 305 has still another movable contact 350 which is movable against a fixed contact 351 when the solenoid 305 is energized. It will be seen that the movable contact 350 is connected to the power line 255. The fixed contact 351 is connected to one side of a cash box solenoid 353. The other side of the solenoid 353 is connected to the power line 256. Thus, the closure of the contacts 350 and 351 energizes the solenoid 353. This solenoid is effective to cause all of the coins which have been deposited to drop into the cash box.

Although the operation of the machine will be clear from the foregoing description, it is believed that a brief summary of the operation may be helpful. Before depositing coins, the purchaser selects the desired merchandise by turning the selector knob 30 to the corresponding position. If the empty light 54 is lighted, the purchaser moves the selector knob 30 to another position. The purchaser then deposits the appropriate number of coins to make up the required purchase price. The coin mechanism 301 thereupon causes the coin operated switch 303 to be closed whereupon the solenoid or relay 305 is energized. The action of the relay 305 and the switches 122 and 124 is such that the motor 105 is operated through a single revolution.

The closure of the coin operated switch 303 also energizes one of the control solenoids 160, according to the selection which has been made by the purchaser. The solenoid armature extension 214 swings the corresponding pawl 197 forwardly, where it is latched by the corresponding latching arm 224.

The rotation of the motor 105 causes the slide bar 155 to move to the left, so that the flange 219 on the pawl 197 engages the corresponding roller 291 and causes the corresponding swingable plate 183 to be swung in a clockwise direction, as shown in FIG. 9.

Such swinging movement of the plate 183 causes the pawl 179 to advance the corresponding ratchet wheel 162 through one step. On the return movement of the slide bar 155, the fixed stop screw 241 releases the latching lever 224, so that the spring 207 is able to return the pawl 197 rearwardly to its original position.

When the ratchet wheel 162 is advanced through one step, the corresponding shaft 90 is rotated through one-sixth of a revolution. Assuming that the particular chute 64 is full, the movement of the shaft 90 causes the lowermost cam 88a to release the corresponding latching lever 72 by swinging the lever upwardly and rearwardly. The lowermost swingable shelf 68 thereupon drops downwardly under the weight of the article on the shelf, so that the article falls into the receiving bin 40, from which it may be removed by the purchaser.

During successive vending cycles, the cams 88 on the shaft 90 release the shelves 68 successively from bottom to top until the entire chute 64 is empty. The shelves 68 hang at an inclined angle so as to act as baffles or deflectors to retard the falling movement of the articles from the shelves above. When the uppermost shelf 68 drops downwardly, the empty switch 288 is caused to shift to its empty position.

The dispensing mechanism of the present invention is subject to selective control so that any of several different articles of merchandise may be dispensed by a single vending motor. The dispensing mechanism is rugged, dependable, and quick-acting, yet is reasonably low in cost.

Various modifications, alternative constructions, and equivalents may be employed without departing from the true spirit and scope of the present invention, as exemplified in the foregoing description and defined in the following claims.

I claim:

1. In a vending machine,
the combination comprising means forming a plurality of vertical chutes,
a plurality of shelves swingably mounted in said chutes and dividing said chutes into a plurality of pigeonhole openings for receiving articles to be dispensed by the machine,
a plurality of latches for holding said shelves in horizontal positions,
a plurality of cams for moving said latches out of engagement with the corresponding shelves to provide for downward swinging movement of the shelves under the weight of the articles,
means accessible to the purchaser for receiving the articles dispensed from said chutes,
a plurality of shafts for supporting said cams,
one of said shafts being provided adjacent each of said chutes,
the cams for operating the latches of each chute being mounted on the corresponding shaft,
the cams on each shaft being staggered around the shaft for successively releasing the latches of each chute from bottom to top,
a plurality of ratchet wheels mounted on said respective shafts,
a plurality of pawl members for advancing said respective ratchet wheels step by step,
a vending motor,
coin controlled means for operating said vending motor through one revolution,
a reciprocable slide member,
a linkage connecting said motor to said slide member for reciprocating said slide member in response to the rotation of said motor,
a plurality of control members swingably mounted on said slide member,
each of said control members having a flange thereon for operating one of said pawl members in response to reciprocation of said slide member,
each of said control members being swingable between an actuated position in which said flange is in an operative relation to the corresponding pawl member and an unactuated position in which said flange is out of operative relation to said pawl member,
each control member having means biasing said control member toward its unactuated position,
a plurality of solenoids for moving said control members to said actuated positions,
and a manually operable selector switch for selecting one of said solenoids for actuation by said coin controlled means.

2. In a machine for vending articles of merchandise,
the combination comprising a cabinet having means therein forming a plurality of generally vertical compartments for holding various articles of merchandise,
a plurality of downwardly swingable shelves in each of said compartments and disposed one above another for supporting the individual articles,
a shaft rotatable adjacent each of said compartments and having means thereon for successively releasing said shelves to dispense the articles,
a ratchet wheel on each of said shafts,
a pawl member for advancing each of said ratchet wheels step by step,
a vending motor,
a reciprocable member connected to and operable by said vending motor,
means for operating said motor through a cycle,
a plurality of movable drive members mounted on said reciprocable member for engaging and operating said pawl members,
each of said drive members being movable between inoperative and operative positions,
a plurality of solenoids for moving said drive members to their operative positions,
and a selector switch for energizing any one of said solenoids.

3. In a machine for vending articles of merchandise,
the combination comprising a cabinet having means therein forming a plurality of generally vertical compartments for holding various articles of merchandise,
a plurality of downwardly swingable shelves in each of said compartments and disposed one above another for supporting the individual articles,
a shaft rotatable adjacent each of said compartments and having means thereon for successively releasing said shelves to dispense the articles,
a ratchet wheel on each of said shafts,
a pawl member for advancing said ratchet wheels step by step,
a vending motor,
a reciprocable member connected to and operable by said vending motor,
means for operating said motor through a cycle,
a plurality of movable drive members mounted on said reciprocable member for engaging and operating said pawl members,
each of said drive members being movable between inoperative and operative positions,
and selectively operable means for moving any one of said drive members to its operative position.

4. In a machine for vending articles of merchandise,
the combination comprising a cabinet having means therein forming a plurality of compartments for holding various articles of merchandise, a plurality of releasable supports in each of said compartments for supporting the individual articles, a shaft rotatable adjacent each of said compartments and having means thereon for successively releasing said supports to dispense the articles, a ratchet wheel on each of said shafts, a pawl member for advancing each of said ratchet wheels step by step, a vending motor, a reciprocable member connected to and operable by said vending motor, means for operating said motor through a cycle, a plurality of movable drive members mounted on said reciprocable member for engaging and operating said pawl members, each of said drive members being movable between inoperative and operative positions, a plurality of solenoids for moving said drive members to their operative positions, and a selector switch for energizing any one of said solenoids.

5. In a vending machine, the combination comprising means forming a plurality of compartments, a plurality of supports swingably mounted in said compartments and dividing said compartments into a plurality of openings for receiving articles to be dispensed by the machine, a plurality of releasable elements for holding said supports in supporting positions, a plurality of cams for releasing said elements to provide for downward swinging movement of the supports under the weight of the articles, means accessible to the purchaser for receiving the articles dispensed from said compartments, a plurality of shafts for supporting said cams, one of said shafts being provided adjacent each of said compartments, the cams for each compartment being mounted on the corresponding shaft, the cams on each shaft being staggered around the shaft for successively releasing the releasable elements of each compartment from bottom to top, a plurality of wheels mounted on said respective shafts, a plurality of pawl members for advancing said respective wheels step by step, a vending motor, coin controlled means for operating said vending motor through one cycle, a reciprocable member, a linkage connecting said motor to said reciprocable member for reciprocating said member in response to the rotation of said motor, a plurality of control members movably mounted on said reciprocable member, each of said control members having a drive element thereon for operating one of said pawl members in response to reciprocation of said reciprocable member, each of said control members being movable between an actuated position in which said drive element is in an operative relation to the corresponding pawl member and an unactuated position in which said drive element is out of operative relation to said pawl member, each control member having means biasing said control member toward its unactuated position, a plurality of actuators for moving said control members to said actuated positions, and a manually operable selector switch for selecting one of said actuators for energization by said coin controlled means.

6. In a vending machine, the combination comprising means forming a plurality of vertical chutes, a plurality of shelves swingably mounted in said chutes and dividing said chutes into a plurality of pigeonhole openings for receiving articles to be dispensed by the machine, a plurality of latches for holding said shelves in horizontal positions, a plurality of cams for moving said latches out of engagement with the corresponding shelves to provide for downward swinging movement of the shelves under the weight of the articles, means accessible to the purchaser for receiving the articles dispensed from said chutes, a plurality of shafts for supporting said cams, one of said shafts being provided adjacent each of said chutes, the cams for operating the latches of each chute being mounted on the corresponding shaft, the cams on each shaft being staggered around the shaft for successively releasing the latches of each chute from bottom to top, a plurality of ratchet wheels mounted on said respective shafts, a plurality of pawl members for advancing said respective ratchet wheels step by step, a vending motor, coin controlled means for operating said vending motor through one revolution, a reciprocable slide member, a linkage connecting said motor to said slide member for reciprocating said slide member in response to the rotation of said motor, a plurality of control members swingably mounted on said slide member, each of said control members having a flange thereon for operating one of said pawl members in response to reciprocation of said slide member, each of said control members being swingable between an actuated position in which said flange is in an operative relation to the corresponding pawl member and an unactuated position in which said flange is out of operative relation to said pawl member, each control member having means biasing said control member toward its unactuated position, a plurality of solenoids for moving said control members to said actuated positions, manually operable switch means for selecting one of said solenoids for actuation by said coin controlled means, a plurality of movable catches mounted on said slide member and engageable with the respective control members for latching each control member in its actuated position, and a plurality of stationary members adjacent said slide member and engageable by said catches during the reciprocation of said slide member for moving each catch out of engagement with the corresponding control member to release the control member for return movement to its unactuated position.

7. In a machine for vending articles of merchandise, the combination comprising a cabinet having means therein forming a plurality of compartments for holding various articles of merchandise, a plurality of releasable supports in each of said compartments for supporting the individual articles, a shaft rotatable adjacent each of said compartments and having means thereon for successively releasing said supports to dispense the articles, a ratchet wheel on each of said shafts, a pawl member for advancing each of said ratchet wheels step by step, a vending motor, a reciprocable member connected to and operable by said vending motor, means for operating said motor through a cycle, a plurality of movable drive members mounted on said reciprocable member for engaging and operating said pawl members, each of said drive members being movable between inoperative and operative positions, a plurality of solenoids for moving said drive members to their operative positions, selector switch means for unlatching any one of said solenoids, a plurality of movable catches mounted on said reciprocable member, each of said catches being engageable with one of said movable drive members for latching the drive member in its operative position, and a plurality of stops adjacent said reciprocable member and engageable by said catches during the reciprocation of said reciprocable member for moving each catch out of engagement with the corresponding drive member and thereby releasing the drive member for return movement to its unoperative position.

8. In a vending machine, the combination comprising a generally vertical chute, a plurality of shelves swingably mounted in said chute and dividing said chute into a plurality of pigeonholes for receiving articles to be dispensed by the machine, a plurality of movable latches for holding said shelves in generally horizontal positions, each of said catches being movable between an active position in the path of one of said shelves and an inactive position out of such path, spring means biasing said latches into said active positions, a plurality of cams having lobes for positively moving said latches to said inactive positions to release said shelves, a shaft supporting said cams, the cams being mounted on said shaft with the lobes of the successive cams staggered around the shaft for successively moving the latches to their inactive positions, and means for turning said shaft through successive steps to release said shelves in succession from the lowermost to the uppermost shelf in said chute.

References Cited in the file of this patent
UNITED STATES PATENTS

| | | |
|---|---|---|
| 1,972,185 | Coates | Sept. 4, 1934 |
| 2,359,398 | Thompson et al. | Oct. 3, 1944 |
| 2,483,352 | Settecasi | Sept. 27, 1949 |
| 2,623,804 | Neidig | Dec. 30, 1952 |
| 2,638,396 | Gabrielsen | May 12, 1953 |
| 2,693,299 | Gross | Nov. 2, 1954 |
| 2,847,146 | Obourn | Aug. 12, 1958 |

FOREIGN PATENTS

| | | |
|---|---|---|
| 22,966 | Great Britain | Oct. 16, 1896 |
| 609,952 | Germany | Feb. 27, 1935 |